Dec. 31, 1968     G. N. BRATSBERG     3,419,897
AIRSTREAM DEFLECTOR FOR VEHICLES
Filed April 27, 1967     Sheet 1 of 2
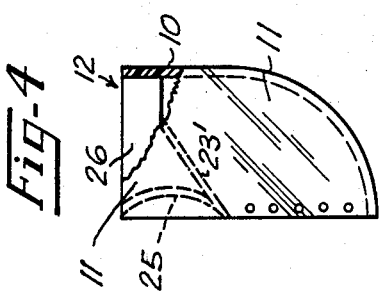
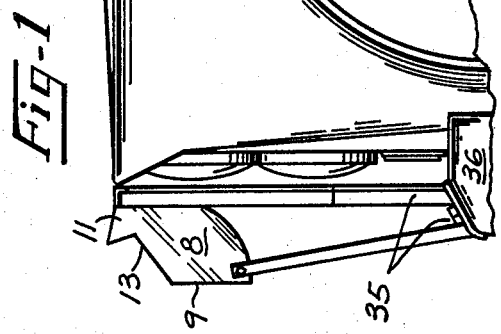
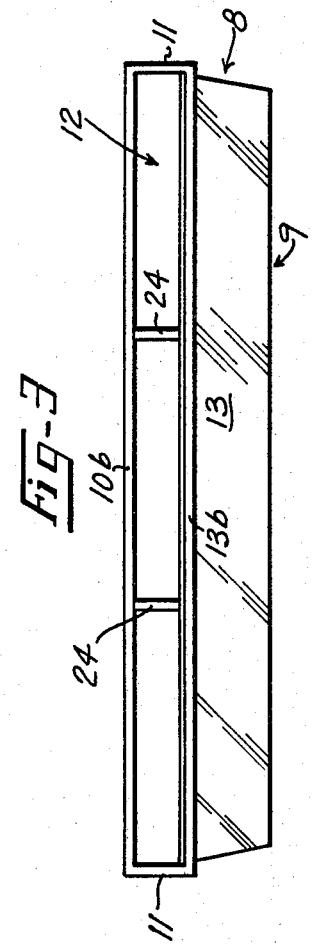
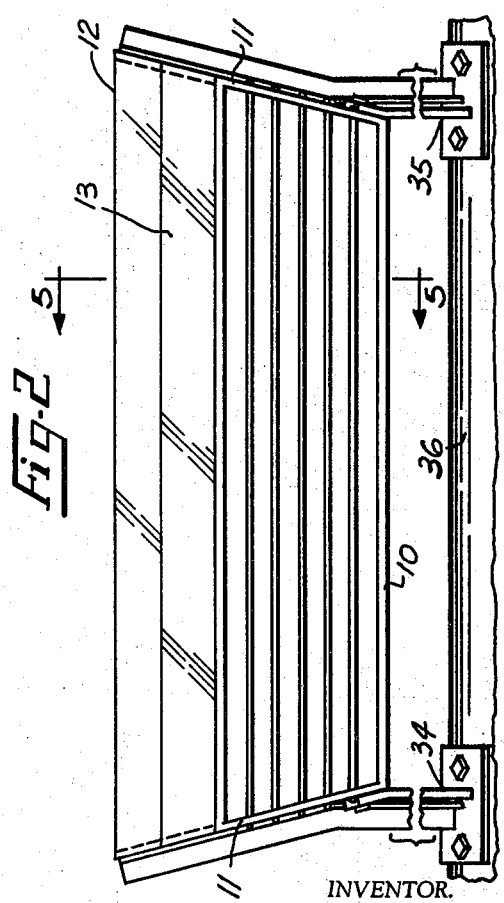
INVENTOR.
Glenn N. Bratsberg
BY Wells & St. John
ATTYS Dec. 31, 1968    G. N. BRATSBERG    3,419,897
AIRSTREAM DEFLECTOR FOR VEHICLES
Filed April 27, 1967    Sheet 2 of 2
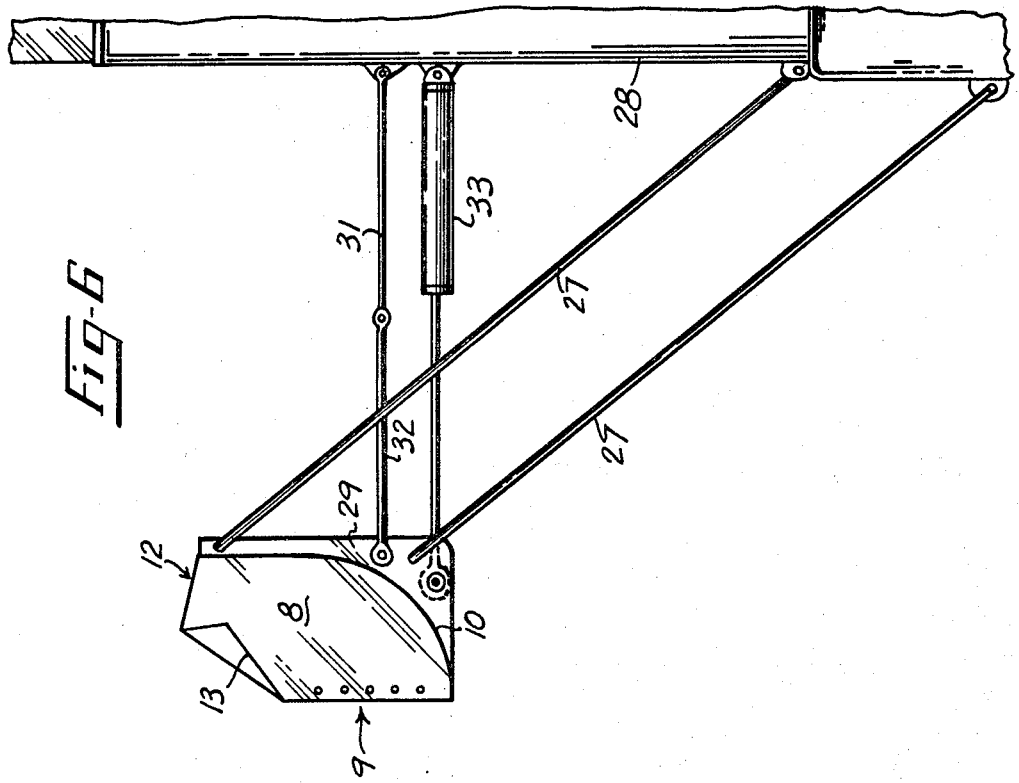
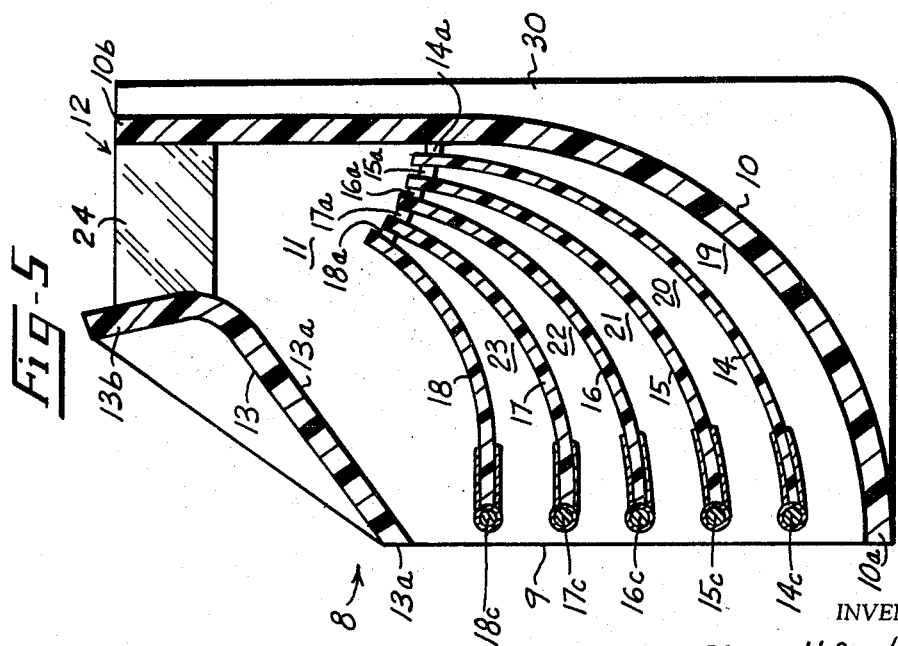
INVENTOR.
Glenn N. Bratsberg
BY
ATTYS.

3,419,897
AIRSTREAM DEFLECTOR FOR VEHICLES
Glenn N. Bratsberg, P.O. Box 723, Lewiston,
Idaho 83501
Filed Apr. 27, 1967, Ser. No. 634,302
5 Claims. (Cl. 296—91)

ABSTRACT OF THE DISCLOSURE

The disclosure shows and describes an airstream deflector device that is to be mounted at the front of the vehicle in position to receive a large volume of air as the vehicle moves forward and deflects the air upwardly through a reduced throat so that the velocity of the received air is substantially increased. This high velocity sheet of air thus meets the air above the device and drives upwardly any small objects such as earth particles, bugs, water drops, snowflakes, and the like, so that these particles are lifted above the vehicle front before the vehicle moves forward through the air. The construction is such that the greater the forward speed of the vehicle, the greater the amount of air deflected upward by the device to do the work of creating an upwardly moving barrier of air of sufficient quantity and force to lift the objects above the vehicle front.

---

The device embodies a shell 8, the front 9 of which is open and the ends of which are upwardly diverging walls 11. A bottom and rear curved wall 10 directs any air entering the front to an outlet 12 at the top. A shorter curved front wall 13 completes the shell. Within the shell are a plurality of curved divider sheets 14, 15, 16, 17 and 18 pivotally secured to the shell 8 at their front ends and curving upwardly to form tapered passages 19, 20, 21, 22 and 23. These sheets 14, 15, 16, 17 and 18 are adjustable up and down at their rear ends in response to variations in the force of the air against them so that as the speed of the vehicle increases the increased amount of air scooped in by the open front 9 will develop a greater upwardly directed wall of air in front of the vehicle. The freedom of movement of the rear ends of the sheets also aids in preventing lodging of particles in the tapered passages.

Prior devices

The U.S. patent to Wilsdorf, No. 2,963,315, is the closest device of which I am aware.

Body of specification

The present invention is embodied in an airstream deflector for vehicles. Its purpose is to provide means to keep the various liquid and solid particles in the air from striking the windshield and adjacent front portions of the vehicle and building up there to obscure the vision of the driver. It is desirable to have such a device that will work whether the particles be dry or wet, frozen or warm and that will be substantially free of clogging. In warm dry air the principal offending particles may be insects of various sizes that strike the windshield with such force that they are spread out over the windshield, and dirt particles that strike and adhere to the crushed insect bodies. In wet stormy weather the particles are most apt to be water drops which may include soil particles, hail and snow.

In the patent above referred to there is an airstream deflector which, in part does deflect bugs, etc. upwardly to prevent them from striking the windshield. The present device provides new unique improvements that provide greatly improved results. The nature and advantages of these improvements will be more clearly understood from the following detailed description and the accompanying drawings illustrating the preferred embodiment of the invention.

In the drawings:
FIG. 1 is a side view of the front corner of an automobile showing the deflector mounted thereon;
FIG. 2 is a front view of the deflector;
FIG. 3 is a plan view of the deflector;
FIG. 4 is an end view of a modified form of the deflector;
FIG. 5 is an enlarged sectional view taken on the line 5—5 of FIG. 2; and
FIG. 6 is a side view showing how the device is used on vertical front vehicles such as buses.

Referring now to the drawings the deflector shell 8 comprises a rear and bottom wall member 10 which is curved smoothly between its front edge and its rear top edge to deflect all particles and air striking it as the vehicle advances into an upwardly moving stream. The shell has a top and front wall member 13 which is spaced above the bottom front edge 10a of the member 10 to provide a large front opening at 9. The top edges 10b and 13b of the members 10 and 13 are much closer to each other than the front edges 10a and 13a so that the space between the members 10 and 13 is of the nature of a curved venturi type throat wherein the volume of air received at the front opening 9 requires that the air be compressed and speeded up to escape through the outlet 12. This essentially is accomplished in the deflector of the Wilsdorf patent, No. 2,963,315. The shell 8 further comprises upwardly diverging end wall members 11. The function of these walls is to cause the airstream issuing at the outlet 12 to become wider transversely of the vehicle as it rises.

To further improve the effectiveness of the device in building up a barrier to prevent particles from reaching the vehicle windshield the shell is provided with a plurality of curved divider sheets 14, 15, 16, 17 and 18. These sheets vary in curvature and in fore and aft length getting shorter and raised less from the bottom sheet 14 to the top sheet 18. The several sheets 14–18 are pivoted by pivot members 14c–18c mounted in the end wall member 11 and are free at their rearward edges so they may adjust to the pressure of the air between them. The lowermost sheet 14 has spacer elements 14a thereon which bear against the wall member 10 so as to maintain a minimum air gap 14b between the rear edge of the sheet 14 and the member 10. Similar spacer elements 15a, 16a, 17a and 18a are provided on the respective sheets 15, 16, 17 and 18 to rest on the next lower sheet and set a minimum air gap between sheets. As shown these gaps are the same. The movement of the sheets in response to the air flow is essentially a movement in response to the speed of the vehicle. In a working device installed upon an automobile in the manner shown in FIGS. 1 and 2 the rear end of the upper sheet 18 began to rise at a speed of approximately 20 miles per hour. The second sheet 17 rose free of the sheet 16 at its rear end at about 35 miles per hour. The third sheet 16 rose free of the sheet 15 at its rear end at about 50 miles per hour. The fourth sheet 15 rose free of the lowermost pivoted sheet 14 at about 65 miles per hour. The lowermost sheet 14 moved away from its resting position with its spacer 14a against the wall member 10 at about 80 miles per hour.

The fact that the several sheets can move upwardly allows more air to be deflected to build the barrier of air that is moving upwardly out of the outlet 12 and advancing against the relatively stationary air in front of the vehicle so that this barrier is able to sweep the particle containing air over the windshield. Also, if any particle or group of particles are too thick to pass through the minimum spacing between two sheets the spacing increases to prevent plugging.

It will be noted that there is an inclined surface 13a on the wall member 13 that is at such an angle that if continued to the wall member 10, it would intersect this member below its top edge 10b. This surface 13a also acts as a stop to limit the upward movement of the sheets 14–18. Spacers 24 are used across the outlet 12 to strengthen the shell 8.

The form of the deflector shown in FIG. 4 varies only in the provision of a curved front wall member 25 connecting the end wall members. In this form the surface 23' is supported from the wall member 25 by spaced braces 26.

When the device is being used on a vehicle wherein the windshield of the vehicle is at the front end as in buses, the mechanism shown in FIG. 6 is used. This mechanism comprises two supports 27 at each end of the shell 8 which are pivotally attached to the vehicle front 28 and to the shell 8 at its ends. The supports 27 are arranged in the well-known parallelogram configuration so as to maintain the shell 8 upright in all positions. The lower ends of the supports 27 are affixed to the vehicle front 28 near the bottom thereof. The shell 8 has ears 29 and 30 to mount the upper ends of the supports 27. A safety link structure 31–32 limits the forward movement of the shell 8, yet allows the shell 8 to be moved in close to the vehicle front 28 when desired. The shell is moved out away from the vehicle front by a simple jack 33. It is necessary that the shell 8 be a substantial distance in front of the windshield in order that it may deflect the offending particles in the air high enough to go over the windshield.

On automobiles the shell 8 can be mounted in front of the hood between the lights. As shown, in FIGS. 1 and 2, two brackets 34 and 35 support the shell 8 and are adapted to be bolted to the front bumper 36 of the automobile. The length of the shell depends upon the width of the windshield it is to protect. The effect of the upwardly diverging end walls 11 is to increase the width of the air stream. Since the air in the stream is compressed at the time it leaves the top of the shell 8 it will expand further laterally and in doing so, protect a windshield that is much wider than the length of the shell 8.

The material of which the shell 8 and the sheets 14–18 are made must be easily cleaned and must be able to withstand the abrasion and corrosive effects of the various particles that pass through the shell. In the drawings the parts are shown as being of a plastic. I have used sheets of the plastic sold under the trade name "Plexiglas."

Stainless steel strips 34 are used to mount the sheets 14–18 on the pivot members 14c–18c. Any suitable materials may, however, be used for the various parts of the device.

From the foregoing description it is believed to be evident that I have provided an air stream deflector to protect automotive vehicle windshields that is capable of setting up an upwardly directed wall of air in advance of the windshield that has sufficient force at all speeds to establish an air canopy over the front part of the vehicle and keep the windshield clear. The action of the movable sheets keeps particles from clogging the deflector and allows greater volumes of air to pass through as the vehicle speed increases.

I claim:
1. An air stream deflector for vehicles comprising an elongated shell having means to mount it on the vehicle: said shell comprising a curved bottom and rear wall member, a front and top wall member and end wall members defining a curved venturi like passage with a wide horizontally directed inlet opening and an upwardly directed outlet opening;
a plurality of divider sheets in said shell pivoted by their front edges to the shell in spaced relation one above the other across the shell inlet opening; and
means maintaining the rear edges of said sheets in spaced relation to each other and to the rear wall member.

2. The device defined in claim 1 wherein the end wall members diverge from each other from bottom to top.

3. The device defined in claim 1 wherein the divider sheets are curved upward toward their rear edges to direct air therebetween upwardly to said outlet.

4. The device defined in claim 1 wherein the divider sheets vary in width with the widest sheet being lowermost and each sheet thereabove being narrower than the one below it.

5. The device defined in claim 1 together with a pair of elongated supports having means to mount them on the front upright wall of a bus; and jack means for moving the shell toward and away from the said front wall.

References Cited

UNITED STATES PATENTS 3,214,215   10/1965   Hansen _____ 296—91
2,963,315   12/1960   Wilsdorf _____ 296—91

PHILIP GOODMAN, *Primary Examiner.*

U.S. Cl. X.R.

296—1